United States Patent
Igarashi et al.

(10) Patent No.: US 12,209,562 B2
(45) Date of Patent: Jan. 28, 2025

(54) METHOD AND DEVICE FOR DIAGNOSING ABNORMALITY IN VEHICLE

(71) Applicant: Nissan Motor Co., Ltd., Yokohama (JP)

(72) Inventors: Kenichi Igarashi, Kanagawa (JP); Hironari Tano, Kanagawa (JP)

(73) Assignee: Nisaan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/620,145

(22) PCT Filed: Apr. 2, 2021

(86) PCT No.: PCT/JP2021/014277
§ 371 (c)(1),
(2) Date: Dec. 17, 2021

(87) PCT Pub. No.: WO2022/208863
PCT Pub. Date: Oct. 6, 2022

(65) Prior Publication Data
US 2024/0426264 A1    Dec. 26, 2024

(51) Int. Cl.
*F02M 25/08* (2006.01)
*F02M 35/10* (2006.01)

(52) U.S. Cl.
CPC .... *F02M 25/0827* (2013.01); *F02M 25/0836* (2013.01); *F02M 35/10386* (2013.01)

(58) Field of Classification Search
CPC .......... F02M 25/0827; F02M 25/0836; F02M 35/10386
See application file for complete search history.

(56) References Cited

U.S. PATENT DOCUMENTS

| | | | |
|---|---|---|---|
| 2019/0360412 A1 | 11/2019 | Dudar | |
| 2022/0136462 A1* | 5/2022 | Asanuma | F02D 41/185 123/520 |

FOREIGN PATENT DOCUMENTS

| | | |
|---|---|---|
| JP | 2006-329086 A | 12/2006 |
| JP | 2018-141438 A | 9/2018 |
| JP | 2019-210877 A | 12/2019 |
| WO | 2020/179150 A1 | 9/2020 |

OTHER PUBLICATIONS

Extended European Search Report of Mar. 21, 2024 of corresponding European Patent Application No. 21847673.7.

* cited by examiner

Primary Examiner — Xiao En Mo
(74) Attorney, Agent, or Firm — Global IP Counselors, LLP

(57) ABSTRACT

A method and device diagnoses a presence or an absence of an abnormality in an evaporated fuel treatment system. The first intake air amount is a detection value of an air flow meter in a state in which the purge control valve has been opened, and is theoretically the same value as the second intake air amount when a purge control valve is closed. The second intake air amount is a theoretical intake air amount indirectly calculated arithmetically, and is a value that reflects a change in the intake air amount accompanying operations of intake system devices. A presence or an absence of an abnormality in the evaporated fuel treatment system is determined based on the first intake air amount and the second intake air amount after a control duty of the purge control valve has reached 100%.

7 Claims, 3 Drawing Sheets

METHOD AND DEVICE FOR DIAGNOSING ABNORMALITY IN VEHICLE

CROSS-REFERENCE TO RELATED APPLICATIONS

This application is a U.S. national stage application of International Application No. PCT/JP2021/014277, filed on Apr. 2, 2021.

BACKGROUND

Technical Field

The present invention relates to a method and device for diagnosing an abnormality in a vehicle.

Background Information

Japanese Laid-Open Patent Application No. 2018-141438 (Patent Document 1) discloses a technology with which when the amount of air introduced from the atmosphere into an intake path of an internal combustion engine is stable, a determination is made, from a change in the amount of air introduced to the intake path when a pump that supplies purge gas to the intake path is driven, as to whether or not purge gas can be supplied to the intake path.

However, in Patent Document 1, when a determination is made as to whether or not purge gas can be supplied to the intake path, the amount of air introduced into the intake path changes when there is a change in an operating state of an intake-related device, such as a valve opening of a throttle valve. Therefore, in Patent Document 1, when a determination is made as to whether or not purge gas can be supplied to the intake path and there is a change in the operating state of an intake-related device, there is a risk that the amount of air introduced into the intake path will change and it will not be possible to determine whether or not purge gas can be supplied to the intake path.

SUMMARY

In the present invention, a determination is made as to whether or not there is an abnormality in an evaporated fuel treatment system in which a purge control valve is opened, a first intake air amount is detected by an air flow meter, and purge gas is introduced into an intake passage using the first intake air amount and a second intake air amount, which is a theoretical amount of air taken into an internal combustion engine.

According to the present invention, it is possible to cancel out diagnostic parameter fluctuation occurring with the operation of an intake system device during diagnosis, and to accurately diagnose the presence or absence of an abnormality in an evaporated fuel treatment system even when the intake air amount changes with the operation of an intake system device.

BRIEF DESCRIPTION OF THE DRAWINGS

Referring now to the attached drawings which form a part of this original disclosure.

DETAILED DESCRIPTION OF EMBODIMENTS

An example of the present invention is described in detail below on the basis of the drawings.

Figure 1:
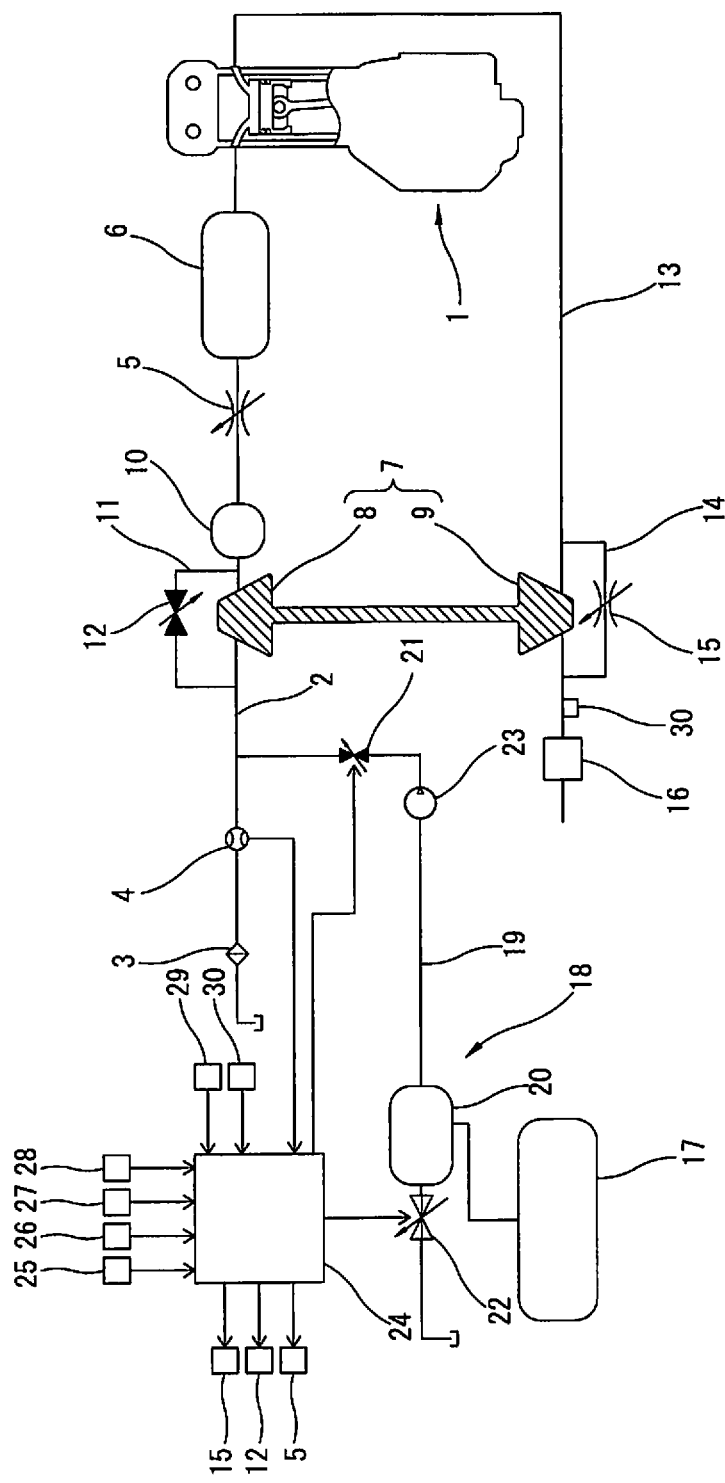
FIG. 1 is a schematic diagram of an outline of a system configuration of an internal combustion engine to which the present invention is applied.

FIG. 1 is a schematic diagram of an outline of a system configuration of an internal combustion engine 1 to which the present invention is applied.

The internal combustion engine 1 is, for example, a multi-cylinder spark-ignited gasoline engine, and is installed as a drive source in an automobile or other vehicle. An intake passage 2 of the internal combustion engine 1 is provided with an air cleaner 3 that collects foreign matter in intake air, an air flow meter 4 that detects an intake air amount, an electric throttle valve 5, and a collector 6 that distributes intake air to intake ports of the cylinders.

The air flow meter 4 is disposed on a downstream side of the air cleaner 3. The air flow meter 4 is a sensor capable of detecting mass flow rate, and this meter detects a first intake air amount, which is an amount of air taken into the internal combustion engine 1. The air flow meter 4 has a built-in temperature sensor and is able to detect an intake temperature in an intake introduction port.

The throttle valve 5 controls the amount of air taken into the internal combustion engine 1 in accordance with a load, and is disposed on a downstream side of the air flow meter 4.

The internal combustion engine 1 also has a turbocharger 7. The turbocharger 7 has a compressor 8 provided to the intake passage 2 and a turbine 9 provided to an exhaust passage 13. The compressor 8 and the turbine 9 are disposed coaxially and rotate integrally. The compressor 8 is disposed in a position on an upstream side of the throttle valve 5 and on a side downstream from the air flow meter 4.

The intake passage 2 is provided with an intercooler 10 on the upstream side of the throttle valve 5. The intercooler 10 is disposed on a downstream side of the compressor 8. The intercooler 10 cools intake air compressed (pressurized) by the compressor 8 and raises filling efficiency.

An intake bypass passage 11 is connected to the intake passage 2. The intake bypass passage 11 is formed so as to bypass the compressor 8 and interconnect an upstream side and the downstream side of the compressor 8.

An electric recirculation valve 12 is provided to the intake bypass passage 11. The recirculation valve 12 is normally closed, but is opened in cases such as when the downstream side of the compressor 8 reaches a high pressure. High-pressure intake air on the downstream side of the compressor 8 is returned to the upstream side of the compressor 8 via the intake bypass passage 11 by the opening of the recirculation valve 12. The recirculation valve 12 can be a "non-return valve" such as one that opens only when pressure on the downstream side of the compressor 8 is a predetermined pressure or greater.

An exhaust bypass passage 14 that bypasses the turbine 9 and joins an upstream side and a downstream side of the turbine 9 is connected to the exhaust passage 13. An electric wastegate valve 15 that controls an exhaust flow rate within the exhaust bypass passage 14 is disposed in the exhaust bypass passage 14. A catalyst for exhaust purification (an exhaust purification catalyst) 16 is provided to the exhaust passage 13, downstream of a downstream-side end of the exhaust bypass passage 14. The catalyst 16 is positioned on an upstream side of the exhaust passage 13, and is, for example, a manifold catalyst.

An evaporated fuel treatment system 18 that treats evaporated fuel in a fuel tank 17 is connected to the intake passage 2.

The evaporated fuel treatment system 18 has an evaporation passage 19, a canister 20 capable of adsorption and desorption of evaporated fuel, an electric purge control valve (purge valve) 21 positioned between the canister 20 and the intake passage 2, an electric drain cut valve 22 that controls the release of evaporated fuel to the exterior, and a purge pump 23 for purging the canister 20.

The evaporation passage 19 introduces evaporated fuel into the intake passage 2, and is connected to the intake passage 2 at a position on the downstream side of the air flow meter 4 and the upstream side of the compressor 8. The evaporation passage 19 is connected at one end to the intake passage 2 and is allowed to communicate (is opened) at the other end with the exterior (the atmosphere).

The canister 20 is provided over the evaporation passage 19, and evaporated fuel generated in the fuel tank 17 is introduced into the canister 20. The canister 20 holds the evaporated fuel by adsorption.

The purge control valve 21 is provided over the evaporation passage 19 and is positioned between the canister 20 and one end of the evaporation passage 19.

The drain cut valve 22 is provided over the evaporation passage 19 and is positioned between the canister 20 and the other end of the evaporation passage 19.

The purge pump 23 is provided over the evaporation passage 19 and positioned between the canister 20 and the purge control valve 21. The purge pump 23 pressurizes purge gas containing evaporated fuel from the fuel tank 17 and introduces the pressurized purge gas into the intake passage 2 when the purge control valve 21 has opened. The purge pump 23 constantly rotates while the vehicle is traveling, and the rotational speed is controlled in accordance with an adsorbed fuel amount, which is the amount of evaporated fuel adsorbed in the canister 20.

For example, when the adsorbed fuel amount is too great, the rotational speed of the purge pump 23 is controlled so as to decrease so that a large amount of evaporated fuel will not flow into the intake passage 2 when the purge control valve 21 has been opened. When the adsorbed fuel amount is too small, such as near zero, it is meaningless to have a large amount of purge gas flow into the intake passage 2 when the purge control valve 21 has been opened; therefore, the rotational speed of the purge pump 23 is controlled so as to decrease.

The rotational speed of the purge pump 23 is controlled by a control signal from a control unit 24.

The control unit 24 is a universally known digital computer provided with a CPU, ROM, RAM, and an input/output interface. Other than a detection signal from the air flow meter 4 described above, the control unit 24 receives input of detection signals of various sensors such as an atmospheric pressure sensor 25 that detects atmospheric pressure, a vehicle speed sensor 26 that detects a speed of the vehicle, a brake sensor 27 that detects a depressed amount of a brake pedal, a crank angle sensor 28 that detects a crank angle of a crankshaft, an accelerator position sensor 29 that detects a depressed amount of an accelerator pedal, and an A/F sensor 30 that detects an air-fuel ratio.

The atmospheric pressure sensor 25 is equivalent to an atmospheric pressure detection unit that detects atmospheric pressure. The vehicle speed sensor 26 is equivalent to a vehicle speed detection unit that detects vehicle speed. The crank angle sensor 28 is capable of detecting an engine speed (engine rotational speed) of the internal combustion engine 1, and is equivalent to a rotational speed detection unit. The accelerator position sensor 29 is capable of detecting not only an accelerator position, which is an operated amount of the accelerator pedal, but also an accelerator change speed, which is a speed with which the accelerator pedal is operated. In other words, the accelerator position sensor 29 is equivalent to an accelerator operation amount detection unit. The A/F sensor 30 is a "wide-area" air-fuel ratio sensor having nearly linear output characteristics according to an exhaust air-fuel ratio, and is disposed in the exhaust passage 13 on an upstream side of the catalyst 16. The A/F sensor 30 is positioned upstream of the catalyst 16 and downstream of the downstream-side end of the exhaust bypass passage 14.

On the basis of the detection signals of the various sensors, the control unit 24 controls the opening and closing of the throttle valve 5, the recirculation valve 12, the wastegate valve 15, the purge control valve 21, and the drain cut valve 22, and optimally controls an injection amount and an injection period of fuel injected from a fuel injection valve (not shown), an ignition period of the internal combustion engine 1, the intake air amount, the air-fuel ratio of the internal combustion engine 1, etc.

The control unit 24 carries out a fuel cut that stops the fuel injection to the internal combustion engine 1 when the vehicle is in decelerating travel. In other words, the control unit 24 is equivalent to a fuel cut control unit that carried out a fuel cut on the internal combustion engine 1. Decelerating travel of the vehicle is, for example, travel when the brake pedal is depressed and the accelerator pedal is not depressed ("coasting travel"), or travel when neither the brake pedal or the accelerator pedal is depressed ("sailing travel").

Furthermore, the control unit 24 carries out an abnormality diagnosis on the evaporated fuel treatment system 18 as an abnormality diagnosis on the vehicle. Specifically, the control unit 24 is equivalent to an abnormality determination unit that, when a second intake air amount has been calculated, detects a first intake air amount while the purge control valve 21 is open and determines the presence or absence of an abnormality in the evaporated fuel treatment system 18 using a diagnostic parameter, which is a difference between the first intake air amount and the second intake air amount. The diagnostic parameter is the result of subtracting the first intake air amount from the second intake air amount. In addition, the control unit 24 is equivalent to a second intake air amount calculation unit that calculates the second intake air amount.

The second intake air amount is a model intake air amount, which is a theoretical intake air amount indirectly calculated arithmetically on the basis of operating status of various devices (e.g., variable valve mechanisms (not shown) of the internal combustion engine 1 and the throttle valve 5) disposed in the intake system of the internal combustion engine (such as a valve timing for intake valves due to the variable valve mechanisms and the throttle position), the speed of the internal combustion engine 1, atmospheric pressure, etc. The second intake air amount is a value that reflects changes in the intake air amount accompanying the operations of the intake system devices, and is calculated as a value that follows changes in the operating state of the internal combustion engine 1. In addition, the second intake air amount is calculated on the assumption that the purge control valve 21 is closed. Specifically, even if the purge control valve 21 is open when the second intake air amount is calculated, the purge control valve 21 is assumed to be closed and the second intake air amount is calculated on the basis of the operating state of the internal combustion engine 1 and the operating status of the various devices of the intake system.

The first intake air amount is a detection value of the air flow meter 4, and is theoretically the same value as the second intake air amount when the purge control valve 21 has closed.

The first intake air amount changes between the opening of the purge control valve 21 and the closing of the purge control valve 21 even if the operating state remains the same. In a state in which the evaporation passage 19 is not separated from the intake passage 2, i.e., a normal state in which the evaporation passage 19 is connected to the intake passage 2, the purge gas pressurized by the purge pump 23 is introduced into the intake passage 2 when the purge control valve 21 is opened.

Therefore, when purge gas is introduced into the intake passage 2, if the operating state remains the same, the first intake air amount (the detection value of the air flow meter 4) in the normal state decreases by a greater amount than when purge gas is not introduced into the intake passage 2. This is because the amount of air passing through the air flow meter 4 decreases in proportion to the amount of purge gas introduced.

In a state such as when the evaporation passage 19 is separated from the intake passage 2, i.e., an abnormal state in which the evaporation passage 19 is not properly connected to the intake passage 2, the purge gas pressurized by the purge pump 23 will not be introduced into the intake passage 2 even if the purge control valve 21 is opened.

Therefore, if the operating state remains the same, the first intake air amount (the detection value of the air flow meter 4) in the abnormal state should be constant regardless of the opened/closed state of the purge control valve 21 because purge gas is not introduced into the intake passage 2 even if the purge control valve 21 is open.

Inasmuch, in the abnormality diagnosis of the evaporated fuel treatment system 18, the evaporated fuel system is diagnosed to be abnormal when the diagnostic parameter, which is the difference between the first intake air amount and the second intake air amount, is equal to or less than a predetermined first threshold value set in advance. The diagnostic parameter is calculated on the basis of the first intake air amount and the second intake air amount detected after a control duty of the purge control valve 21 has reached 100%.

The abnormality diagnosis of the evaporated fuel treatment system 18 ends when the purge gas that has flowed into the intake passage 2 during the diagnosis is discharged from the cylinders of the internal combustion engine 1. Specifically, the diagnostic parameter is calculated, the purge control valve 21 is closed, and until a predetermined amount of time has elapsed thereafter, normal purge control is prohibited. Normal purge control is control in which the purge control valve 21 is opened during air-fuel ratio feedback control to introduce an appropriate amount of purge gas into the intake passage 2.

Figure 2:
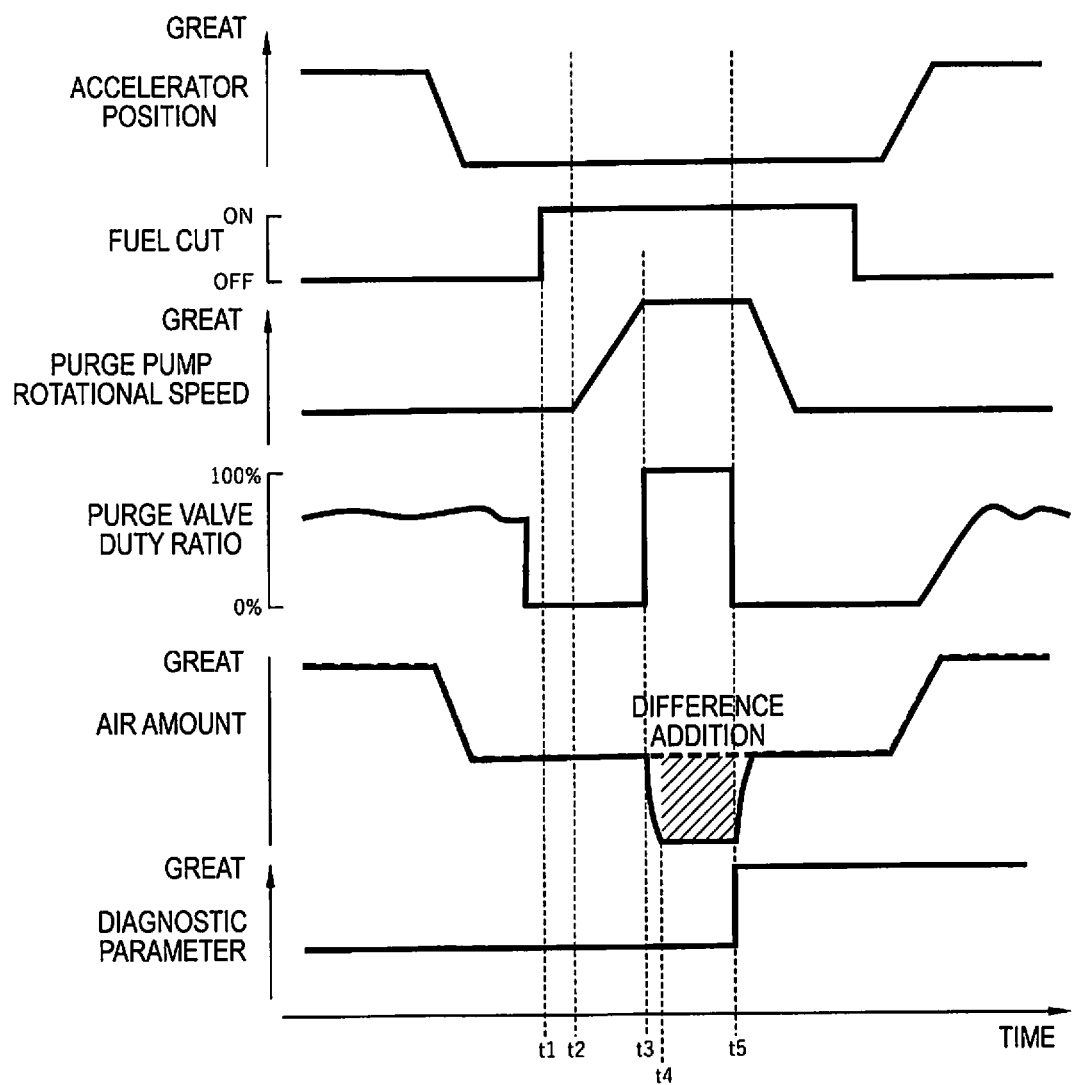
FIG. 2 is a timing chart of an example of an operation when an abnormality diagnosis is carried out on an evaporated fuel treatment system.

FIG. 2 is a timing chart of an example of an operation when the abnormality diagnosis is carried out on the evaporated fuel treatment system 18. Air amounts shown by solid lines in FIG. 2 represent the first intake air amount. An air amount shown by a dashed line in FIG. 2 represents the second intake air amount.

Time t1 is a timing at which the fuel cut of the internal combustion engine 1 is initiated. Time t2 is a timing at which the rotational speed of the purge pump 23 is increased in preparation for the opening of the purge control valve 21. Time t2 is a timing at which, for example, conditions of steps S1 to S4 of FIG. 3 (described hereinafter) are all "Yes." Time t3 is a timing at which the rotational speed of the purge pump 23 reaches a rotational speed for diagnosis (a rotational speed for diagnosing an abnormality of the evaporated fuel treatment system 18), and is the timing at which the purge control valve 21 is switched from fully closed (a duty ratio of 0%) to fully open (a duty ratio of 100%). Time t4 is a timing at which the purge control valve 21 reaches fully open. Time t5 is a timing at the elapse of a predetermined time after time t4, and is the timing at which the diagnostic parameter is calculated. The diagnostic parameter is an average value of a flow rate difference (a flow rate difference between the first intake air amount and the second intake air amount) obtained by adding the differences between the first intake air amount and the second intake air amount between time t4 and time t5, and dividing the sum by a predetermined time (the time from time t4 to time t5).

The second intake air amount in FIG. 2 coincides with the first intake air amount up to time t3 at which the purge control valve 21 is switched from fully open to fully closed, and after the timing at which the purge control valve 21 has been switched from fully open to fully closed and the purge control valve 21 has actually reached fully closed (after an elapse of time equivalent to a response delay from time t5).

The abnormality diagnosis of the evaporated fuel treatment system 18 determines that there is an abnormality when the value of the diagnostic parameter calculated at the timing of time t5 is equal to or less than the first threshold value.

In such an abnormality diagnosis of the evaporated fuel treatment system 18, due to the second intake air amount, which reflects a change in the intake air amount accompanying the operations of the intake system devices, and the first intake air amount, which is a detection value of the air flow meter 4, being used in the diagnosis, it is possible to cancel out fluctuation of the diagnostic parameter accompanying the operation of the intake system devices during the diagnosis, and to accurately diagnose the presence or absence of an abnormality in the evaporated fuel treatment system 18 even when the intake air amount changes as the intake system devices operate.

The abnormality diagnosis of the evaporated fuel treatment system 18 is preferably carried out during the fuel cut of the internal combustion engine 1. If the abnormality diagnosis of the evaporated fuel treatment system 18 is carried out during the fuel cut of the internal combustion engine 1, the effect on operability accompanying air-fuel ratio fluctuation can be reduced.

The abnormality diagnosis of the evaporated fuel treatment system 18 is preferably not carried out in cases in which the air-fuel ratio in the cylinders (in the combustion chambers) of the internal combustion engine 1 is less than a first air-fuel ratio, which is a predetermined value set in advance, when the purge control valve 21 is opened. The first air-fuel ratio is a diluted (lean) air-fuel ratio at which combustion does not occur in the cylinders during a fuel cut.

The air-fuel ratio in the cylinders when the purge control valve 21 is opened is calculated using, for example, the first intake air amount detected by the air flow meter 4, the flow rate of the purge gas, and the amount of evaporated fuel in the purge gas.

The flow rate of the purge gas and the amount of evaporated fuel in the purge gas are calculated by the control unit 24. The flow rate of the purge gas can be calculated from the valve position of the purge control valve 21 and the rotational speed of the purge pump 23. The amount of evaporated fuel in the purge gas is calculated from, for example, an amount of deviation (amount of fluctuation) in the air-fuel ratio which fluctuates due to the purge gas being introduced during the air-fuel ratio feedback control of the internal combustion engine 1.

The abnormality diagnosis of the evaporated fuel treatment system 18 is carried out when the air-fuel ratio in the cylinders of the internal combustion engine 1 is so lean that there is no combustion, whereby situations in which combustion does not occur in the cylinders of the internal combustion engine 1 can be avoided regardless of a fuel cut being underway, and it is possible to prevent worsening of driving performance and discomfort to the driver.

The abnormality diagnosis of the evaporated fuel treatment system 18 may involve detecting the first intake air amount and calculating the diagnostic parameter in a state in which the rotational speed of the purge pump 23 is progressively increased commensurately with a decrease in atmospheric pressure.

When the altitude increases and the ambient atmospheric pressure decreases, the air taken into the internal combustion engine 1 becomes thinner. When the air taken into the internal combustion engine 1 becomes thinner, if the position (control duty) of the purge control valve 21 and the rotational speed of the purge pump 23 remain the same, a mass flow rate decreases although a volumetric flow rate does not change.

Inasmuch, in the abnormality diagnosis of the evaporated fuel treatment system 18, the rotational speed of the purge pump 23 during the diagnosis is increased in accordance with atmospheric pressure, whereby the same diagnostic parameter value as on level ground can be always ensured, any worsening of an S/N ratio due to a change in atmospheric pressure can be minimized, and the presence or absence of an abnormality can be determined regardless of atmospheric pressure (as with level ground, even at high altitude).

The abnormality diagnosis of the evaporated fuel treatment system 18 may be carried out when a temperature of the catalyst 16 is equal to or greater than a predetermined temperature. The predetermined temperature is a temperature at which the catalyst 16 is activated to an extent such that the evaporated fuel in the purge gas can be treated. The predetermined temperature is, for example, an activation temperature of the catalyst 16. In other words, the abnormality diagnosis of the evaporated fuel treatment system 18 may be carried out when the catalyst 16 is warmed up.

It thereby becomes possible for the evaporated fuel in the purge gas to be purified by the catalyst 16 at the time of the abnormality diagnosis of the evaporated fuel treatment system 18, and the evaporated fuel will not be discharged out of the vehicle through the exhaust passage 13. In other words, a diagnosis of the presence or absence of an abnormality in the evaporated fuel treatment system 18 can be carried out without worsening exhaust performance.

The temperature of the catalyst 16 can, for example, be estimated on the basis of an amount of heat supplied from the internal combustion engine 1 to the catalyst 16. The supplied heat amount per combustion can be calculated from the fuel injection amount, the engine speed, etc. A total supplied heat amount supplied from the internal combustion engine 1 to the catalyst 16 is calculated by adding the supplied heat amounts per combustion. The temperature of the catalyst 16 can be estimated on the basis of the total supplied heat amount. The temperature of the catalyst 16 may be directly detected by a temperature sensor.

Figure 3:
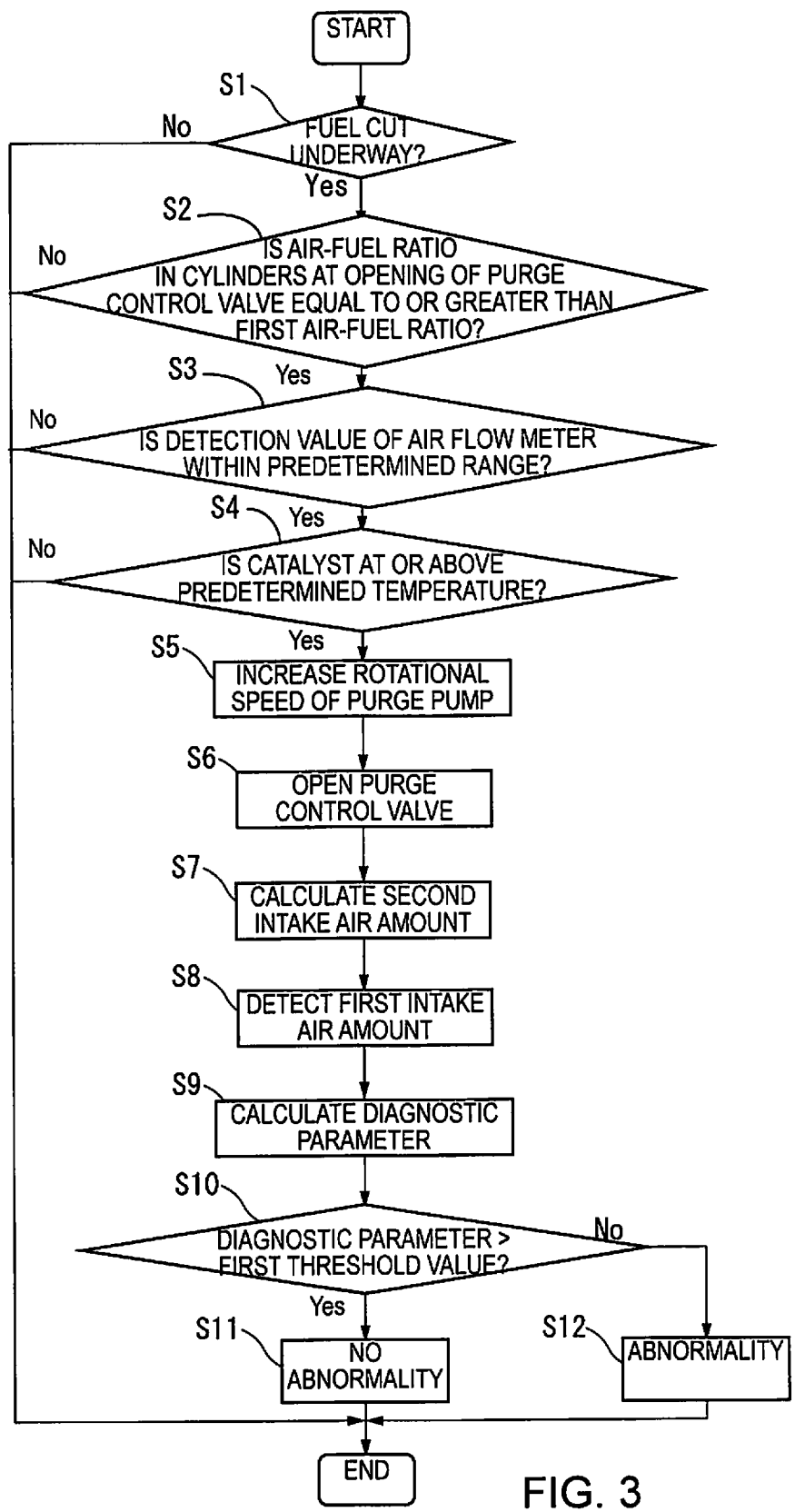
FIG. 3 is a flowchart of a flow of control when an abnormality diagnosis is carried out on an evaporated fuel treatment system.

FIG. 3 is a flowchart of a flow of control when an abnormality diagnosis of the evaporated fuel treatment system 18 is performed.

In step S1, a determination is made as to whether or not a fuel cut is currently underway. When it is determined in step S1 that the internal combustion engine 1 is not in a fuel cut, the current routine is ended without carrying out an abnormality diagnosis of the evaporated fuel treatment system 18.

In step S2, a determination is made as to whether or not the air-fuel ratio in the cylinders will be equal to or greater than the first air-fuel ratio when the purge control valve 21 is opened. When it is determined in step S2 that the air-fuel ratio in the cylinders will not be equal to or greater than the first air-fuel ratio when the purge control valve 21 is opened, the current routine is ended without carrying out an abnormality diagnosis of the evaporated fuel treatment system 18.

In step S3, a determination is made as to whether or not the first intake air amount, which is the detection value of the air flow meter 4, has entered a predetermined range. When it is determined in step S3 that the first intake air amount has not entered the predetermined range, the current routine is ended without carrying out an abnormality diagnosis of the evaporated fuel treatment system 18.

In step S4, a determination is made as to whether or not the catalyst 16 is at or above a predetermined temperature. When it is determined in step S4 that the catalyst 16 is not at or above a predetermined temperature, the current routine is ended without carrying out an abnormality diagnosis of the evaporated fuel treatment system 18.

In step S5, the rotational speed of the purge pump 23 is increased to a rotational speed for the abnormality diagnosis of the evaporated fuel treatment system 18.

In step S6, the purge control valve 21 is opened. In step S7, the second intake air amount is calculated. In step S8, the first intake air amount is detected. In step S9, the diagnostic parameter, which is the difference between the first intake air amount and the second intake air amount, is calculated. The diagnostic parameter is the average value of flow rate differences obtained by adding the differences between the first intake air amount and the second intake air amount in a predetermined time and dividing the sum by the predetermined time.

In step S10, a determination is made as to whether or not the diagnostic parameter is greater than the first threshold value. When the diagnostic parameter is greater than the first threshold value, the process advances to step S11 and it is determined that there is no abnormality in the evaporated fuel treatment system 18. When the diagnostic parameter is equal to or less than the first threshold value, the process advances to step S12 and it is determined that there is an abnormality in the evaporated fuel treatment system 18.

A specific embodiment of the present invention was described above, but the embodiment described above is not provided by way of limitation on the present invention, to which various alterations can be made within a range that does not deviate from the scope of the invention.

For example, rather than using the average value of the difference between the first intake air amount and the second intake air amount, the abnormality diagnosis of the evaporated fuel treatment system 18 can use, for example, the difference between the first intake air amount and the second intake air amount at the point in time when the purge control valve 21 is fully open, or the ratio between the first intake air amount and the second intake air amount, as the diagnostic parameter.

Another possibility is to calculate the second intake air amount not on the assumption that the purge control valve 21 is closed but on the assumption that the purge control valve 21 is open, and to determine an abnormality in the evaporated fuel treatment system 18 according to whether or not the first intake air amount and the second intake air amount are approximately the same. Rather than during a fuel cut, the abnormality diagnosis of the evaporated fuel treatment system 18 can also be carried out during idling or under other various conditions. The abnormal state of the evaporated fuel treatment system 18 includes not only the abnormality of the evaporation passage 19 and the intake passage 2 not being connected, but also an abnormality of the evaporation passage 19 being clogged, an abnormality of the purge control valve 21 not operating, and various other abnormalities.

The embodiment described above pertains to a method and device for diagnosing an abnormality in a vehicle.

The invention claimed is:

1. A vehicle abnormality diagnosing method for diagnosing an abnormality in a vehicle having an air flow meter that detects a first intake air amount, which is an intake air amount of an internal combustion engine installed in the vehicle, and an evaporated fuel treatment system that is connected to an intake passage of the internal combustion engine at a position on a downstream side of the air flow meter for introducing a purge gas containing evaporated fuel from a fuel tank into the intake passage when a purge control valve is opened, the method comprising:
    calculating a second intake air amount, which is a theoretical intake air amount of the internal combustion engine;
    detecting the first intake air amount in a state in which the purge control valve has been opened; and
    determining a presence or an absence of an abnormality in the evaporated fuel treatment system using the first intake air amount and the second intake air amount.

2. The vehicle abnormality diagnosing method according to claim 1, wherein
    the evaporated fuel treatment system is diagnosed as having the abnormality when a difference between the first intake air amount and the second intake air amount is equal to or less than a predetermined first threshold value set in advance.

3. The vehicle abnormality diagnosing method according to claim 1, wherein
    the determining of the presence or the absence of the abnormality in the evaporated fuel treatment system is carried out during a fuel cut of the internal combustion engine.

4. The vehicle abnormality diagnosing method according to claim 3, further comprising
    calculating an air-fuel ratio in cylinders of the internal combustion engine when the purge control valve has been opened using a flow rate of the purge gas and an amount of the evaporated fuel in the purge gas when the purge control valve has been opened, and
    the determining of the presence or the absence of the abnormality in the evaporated fuel treatment system is not carried out when a calculated air-fuel ratio of the cylinders is less than a predetermined value set in advance.

5. The vehicle abnormality diagnosing method claim 1, wherein
    the first intake air amount is detected in a state in which a rotational speed of a purge pump that pressurizes the purge gas to a commensurately greater extent as atmospheric pressure decreases has been increased.

6. The vehicle abnormality diagnosing method according to claim 1, wherein
    the determining of the presence or the absence of the abnormality in the evaporated fuel treatment system is carried out when a temperature of an exhaust purification catalyst provided in an exhaust passage of the internal combustion engine is equal to or greater than a predetermined temperature.

7. A vehicle abnormality diagnosing device for diagnosing an abnormality in a vehicle, the vehicle abnormality diagnosing device comprising:
    an air flow meter that detects a first intake air amount, which is an intake air amount of an internal combustion engine installed in the vehicle;
    an evaporated fuel treatment system that is connected to an intake passage of the internal combustion engine at a position on a downstream side of the air flow meter, and that introduces a purge gas containing evaporated fuel from a fuel tank into the intake passage when a purge control valve is opened;
    a second intake air amount calculation unit that calculates a second intake air amount, which is a theoretical intake air amount of the internal combustion engine; and
    an abnormality determination unit that detects the first intake air amount in a state in which the purge control valve has been opened, and determines a presence or an absence of an abnormality in the evaporated fuel treatment system using the first intake air amount and the second intake air amount.

* * * * *